United States Patent
Nukui et al.

[11] Patent Number: 5,861,556
[45] Date of Patent: Jan. 19, 1999

[54] FLOWMETER

[75] Inventors: Kazumitsu Nukui, Fujisawa; Toshiharu Saito, Ageo; Tokudai Neda, Tokyo, all of Japan

[73] Assignee: Tokyo Gas Co., Ltd., Tokyo, Japan

[21] Appl. No.: 747,300

[22] Filed: Nov. 12, 1996

[51] Int. Cl.[6] .......................................... G01F 1/68
[52] U.S. Cl. .............................................. 73/204.17
[58] Field of Search ................. 73/204.17, 861.18, 73/861.77, 204.27, 204.26, 3

[56] References Cited

U.S. PATENT DOCUMENTS

| | | | |
|---|---|---|---|
| 4,320,650 | 3/1982 | Kita | 73/3 |
| 4,326,412 | 4/1982 | Kobayashi et al. | 73/204.27 |
| 4,399,696 | 8/1983 | Feller | 73/861.77 |
| 4,404,859 | 9/1983 | Ohsawa et al. | 73/861.18 |
| 4,535,637 | 8/1985 | Feller | 73/861.77 |
| 4,599,895 | 7/1986 | Wiseman | |
| 5,020,373 | 6/1991 | Kamiunten et al. | |
| 5,090,241 | 2/1992 | Kobayashi et al. | 73/204.26 |

FOREIGN PATENT DOCUMENTS

| | | |
|---|---|---|
| 0 224 741 A1 | 11/1986 | European Pat. Off. |
| 54-34755 | 3/1979 | Japan |
| 61-120016 | 6/1986 | Japan |
| 63-14118 | 1/1988 | Japan |
| 2 251 129 | 6/1992 | United Kingdom |

OTHER PUBLICATIONS

ISA Transactions, vol. 28, No. 4, 1987, Research Triangle Park, NC, D. Ginesi: "A Review of Insertion Type Flow-metering Devices", pp. 1–8.

Patent Abstracts of Japan, JP 01 118721 A, Nakanishi Mikima: "Flow Rate Measuring Instrument".

I&CS Instruments and Control Systems, vol. 66, No. 3, Mar. 1993, Radnor, Pennsylvania, Wayne Labs: "Thermal Mass Flowmeter Works in CEMS Applications".

*Primary Examiner*—George M. Dombroske
*Assistant Examiner*—Jewel V. Artis
*Attorney, Agent, or Firm*—Holland & Hart LLP

[57] ABSTRACT

A plurality of flow velocity sensors are vertically installed in line at different positions in the same cross section in a gas flow passage in a pipe. Detection signals from the flow velocity sensors are inputted to a mean flow velocity computing unit which calculates a mean value of flow velocity measurements. The mean flow rate calculated at the mean flow velocity computing unit is converted into a flow rate by a flow rate computing unit to be displayed by a display. Regardless of flow velocity distribution in the pipe, which may change due to differences in the pipe shape, flow rates are accurately measured. As a result, flow rates are accurately measured over a wide range.

15 Claims, 15 Drawing Sheets

FLOWMETER

BACKGROUND OF THE INVENTION

The present invention relates to a flowmeter for measuring and displaying a flow rate of fluid, such as a gas.

A flowmeter utilizing a hot-wire current meter has been known, of which application includes a gas meter. The hot-wire current meter determines flow velocity through the use of the fact that the cooling rate of the hot wire installed in a pipe is a function of the flow velocity of fluid flowing through the pipe. The flowmeter with the hot-wire current meter calculates a flow rate to display from the flow velocity.

FIGS. 1, 2 and 3 show the structure of an example of a conventional flowmeter using a hot-wire current meter. This flowmeter is equipped with a flow velocity sensor 1002 installed, for example, in the center of a pipe 1001. The flow velocity sensor 1002 has a hot wire 1002A which is connected to a DC power source 1003B via a resistor 1003A. Both ends of the resistor 1003A are connected to a computing circuit 1003C which calculates flow rates. A display 1003D which displays a flow rate is connected to the computing circuit 1003C.

If the supply voltage of the DC power source is $V_0$, the resistance of the hot wire 1002A is $r_0$, the resistance of the resistor 1003A is $R_0$, and the electric current flowing through the hot wire 1002A and resistor 1003A is $i_0$, then the relationship in equation (1) holds:

$$i_0 = V_0/(R_0 + r_0) \quad (1)$$

When $r_0 >> R_0$, equation (1) is approximated by:

$$i_0 = V_0/r_0 \quad (2)$$

The resistance $r_0$ of the hot wire 1002A changes due to flow velocity. Therefore, when the voltage $V_0$ is constant, the current $i_0$ also changes due to the flow velocity according to equation (2). Consequently, the flow rate $Q_0$ corresponding to the flow velocity is a function of the electric current $i_0$, which is expressed by:

$$Q_0 = K_0 \times (i_0 - i_{00}) \quad (3)$$

In equation (3), $K_0$ is a coefficient according to the pipe and the like, and $i_{00}$ is the electric current flowing through the hot wire 1002A and resistor 1003A when the flow rate $Q_0$ equals zero.

The electric current $i_0$ in equation (3) is determined by $i_0 = v_0/R_0$ when the voltage across the resistor 1003A is $v_0$. The computing circuit 1003C, shown in FIG. 3, uses equation (3) to calculate the flow rate $Q_0$. Then, the calculated flow rate $Q_0$ is displayed by the display 1003D.

However, flow velocity in the pipe 1001 has a flow velocity distribution varied in the same cross section, due to varied shapes, bends and branches in the pipe, and the magnitude of the flow rate. Changes in flow velocity are proportional to changes in a flow rate in the pipe 1001 within a narrow range of measurement locations. Accordingly, in a conventional flowmeter wherein the flow velocity sensor 1002 is located at one position in the pipe 1001, only flow velocity at that location is determined in the pipe 1001. That is, a problem in the conventional flowmeter is that flow rates cannot be accurately determined within a wide measurement range of flow rates.

The present invention is designed in view of the problems described above relating to conventional devices. It is the objective of the invention to provide a flowmeter with a simple structure which accurately measures flow rates, regardless of flow velocity distributions in a pipe.

SUMMARY OF THE INVENTION

A flowmeter of the present invention comprises: a) a plurality of flow velocity sensors each of which detects flow velocity of fluid and is installed at a different position in the same cross section perpendicular to the direction of the length of a pipe; b) a mean flow velocity computing means for calculating the mean value of flow velocity measurements at the multiple positions, using output signals of the plural flow velocity sensors as inputs; and c) a flow rate computing means for calculating a flow rate of fluid based on the result calculated by the mean flow velocity computing means.

In the flowmeter, flow velocity is measured at the multiple positions in the same cross section by the plural flow velocity sensors. The mean value of these measurements is calculated by the mean flow velocity computing means. The flow rate is calculated by the flow rate computing means based on the mean flow velocity. The flow rate is displayed by the display means. As a result, measurement accuracy dramatically improves, which enables accurate flow rate measurement over a wide range, compared to the conventional flowmeter which uses one flow velocity sensor to measure flow velocity only in the center of a flow passage.

The flowmeter of the present invention comprises: a) a guide insertion section which passes through the wall of a pipe along the direction of the length, at any position of the wall of the pipe; b) a hollow guide which is inserted into the pipe via the guide insertion section and has a plurality of first fluid passage holes in the direction of the flow of fluid; c) a flow velocity sensor unit which is inserted into the guide and has a plurality of second fluid passage holes corresponding to the plural first fluid passage holes of the guide and has a plurality of flow velocity sensors facing the plural second fluid passage holes; d) a mean flow velocity computing means for calculating the mean value of flow velocity measurements measured at the multiple points in the fluid flow passage with the output signals of the plural flow velocity sensors in the flow velocity sensor unit as inputs; and e) a flow rate computing means for calculating a flow rate of fluid based on the result calculated by the mean flow velocity computing means.

The flowmeter is easily installed since the flowmeter is constructed by inserting the flow velosity sensor unit into the guide from the exterior.

Furthermore, the flowmeter of the present invention comprises: a) a plurality of guide insertion sections each of which passes through the wall of a pipe in the same cross section perpendicular to the direction of the length of the pipe; b) a plurality of hollow guides each of which is inserted into the pipe via each of the guide insertion sections and has at least one first fluid passage hole along the direction of the flow of fluid; c) a plurality of flow velocity sensor units each of which is inserted into each of the guides and has at least one second fluid passage hole corresponding to the first fluid passage hole of the guide and has at least one flow velocity sensor facing the second fluid passage hole; d) a mean flow velocity computing means for calculating the mean value of flow velocity measurements measured at the multiple points in the fluid flow passage with the output signals of the plural flow velocity sensors in the flow velocity sensor units as inputs; and e) a flow rate computing means for calculating a flow rate of fluid based on the result calculated by the mean flow velocity computing means.

The flowmeter has the plural flow velocity sensor units, which enables more flow velocity sensors to be located in the same cross section. The accuracy of measurement thus improves.

It is preferable that the guides are formed into cylinders in the flowmeter so that they will not obstruct a flow of fluid.

The guide may comprise, inside its hollow body, a partition which has at least one third fluid passage hole corresponding to the first fluid passage hole along the direction of the length; and semicircular cylindrical unit insertion sections on both sides of the partition. The flow velocity sensor unit may comprise two semicircular cylindrical unit members which are capable of being inserted into their respective unit insertion sections of the guides. Each of the two semicircular cylindrical unit members may have at least one second fluid passage hole facing the third fluid passage hole. The flow velocity sensors may be placed corresponding to the second fluid passage hole in the unit member located downstream.

Furthermore, the guides may comprise two partitions inside the hollow body thereof, which have at least one third fluid passage hole corresponding to the first fluid passage hole in the direction of the length and may comprise three unit insertion sections divided by the two partitions. The flow velocity sensor unit may comprise three unit members which are capable of being inserted into their respective unit insertion sections of the guides. Each of the three unit members has at least one second fluid passage hole facing the third fluid passage hole. The flow velocity sensors may be installed corresponding to the second fluid passage hole of the unit member located in the center in the direction of flow.

The flowmeter of the invention may comprise an alignment indicator on the external wall of the guide, corresponding to the first fluid passage hole, to match the installation direction of the guide. Thus the guide is correctly installed into the pipe.

Furthermore, the flowmeter of the invention comprises a plurality of flow velocity sensors installed in the pipe at multiple positions in the direction perpendicular to the direction of the length of the pipe, each of which has a heating element which is heated by an electric current and changes its resistance in response to its temperatures; a flow velocity detection circuit wherein the heating elements of the flow velocity sensors are connected in series or in parallel to a shared power source, and which outputs the parameter depending on a mean value of flow velocity measurements at the installation positions of the flow velocity sensors; and a flow rate computing means for calculating a flow rate of fluid flowing through the pipe based on the output from the flow velocity detection circuit.

In the flowmeter, the flow velocity detection circuit outputs the parameter depending on the mean value of flow velocity measurements measured at the positions where the flow velocity sensors are located. The flow rate computing means calculates the flow rate of fluid flowing through the pipe, based on the output of the flow velocity detection circuit.

The flow velocity detection circuit may be constructed such that the heating elements of the flow velocity sensors are connected in parallel to the shared constant-voltage power source, and a value corresponding to the sum of electric currents flowing through the heating elements is outputted as the parameter.

In the flowmeter with the structure described above, the temperature and resistance of the heating element of each of the flow velocity sensors change in response to flow rates. As a result, the sum of the electric currents flowing through the heating elements changes. The flow velocity detection circuit outputs a value corresponding to the sum of the electric currents as the parameter which depends on the mean value of the flow velocity measurements measured at the positions where the flow velocity sensors are located.

In addition, the flow velocity detection circuit may be constructed such that the heating elements of the flow velocity sensors are connected in series to the shared power source and a value corresponding to the sum of the resistances of the heating elements is outputted as the parameter.

In the flowmeter with the structure described above, the temperature and resistance of the heating element of each of the flow velocity sensors change in response to flow rates. As a result, the sum of the resistances of the heating elements changes. The flow velocity detection circuit outputs a value corresponding to the sum of the resistances as the parameter which depends on a the mean value of the flow velocity measurements measured at the positions where the flow velocity sensors are located.

Furthermore, the flowmeter of the invention comprises: a) a cylindrical sensor holder installed to be perpendicular to the direction of the length of the pipe, having a plurality of flow velocity sensors for detecting flow velocity of fluid and a vortex detection sensor for detecting the frequency of Karman vortices generated by passing fluid; b) a mean flow velocity computing means for calculating the mean value of flow velocity measurements at the multiple positions based on the outputs of the plural flow velocity sensors; and c) a flow rate computing means for determining a flow rate of fluid based on the result calculated by the mean flow velocity computing means in a low flow rate range and determining a flow rate of fluid based on the result detected by the vortex detection sensor in a high flow rate range.

In the flowmeter, where quantity of flow is small and below a specific rate, the plural flow velocity sensors measure flow velocity at the multiple points in the same cross section in the pipe. The mean value of the measurements is calculated by the mean flow rate computing means. The flow rate is determined by the flow rate computing means based on the mean flow velocity. On the other hand, where quantity of flow is large, the vortex detection sensor detects a frequency, that is, the number of vortices of Karman vortices generated by fluid passing through both sides of the sensor holder. The flow rate computing means determines the flow rate based on the detected result. Accordingly, where the flow rate is low, a wider range of flow rates is measured with significant improvement in measurement accuracy, compared to conventional flowmeters which measure flow velocity in the center of the flow passage by one flow velocity sensor. Where the flow rate is high, the vortex detection sensor enables measurement of a wider range of flow rates.

The sensor holder may comprise a cylindrical element with a plurality of fluid passage holes along the direction of fluid flow and a through hole intersecting the fluid passage holes. The plural flow velocity sensors are located to face the respective fluid passage holes. The vortex detection sensor may be one pressure sensor or a pair thereof, facing the through hole and located to detect the differential of pressures between both sides of the cylindrical element due to generated vortices.

The sensor holder may comprise a cylindrical element with a plurality of fluid passage holes along the direction of fluid flow. The plural flow velocity sensors are located to face the respective fluid passage holes. The vortex detection sensor may be a pair of pressure sensors located to detect the differential of pressures between both sides of the cylindrical element due to generated vortices.

BEST MODES FOR CARRYING OUT THE INVENTION

Preferred embodiments of the present invention will now be described in detail with reference to the accompanying drawings.

Figure 1:
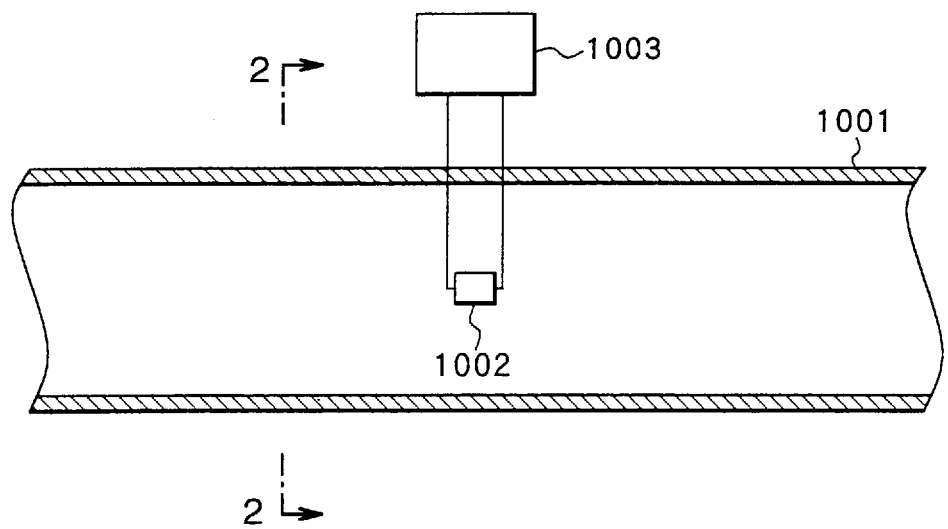
FIG. 1 is a cross-sectional view showing the measurement principle of a conventional flowmeter.
Figure 2:
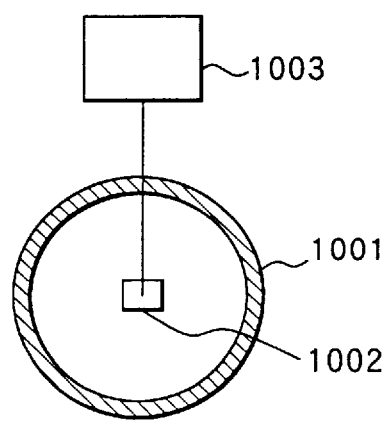
FIG. 2 is a cross-sectional view taken in the direction of arrows A—A in FIG. 1.
Figure 3:
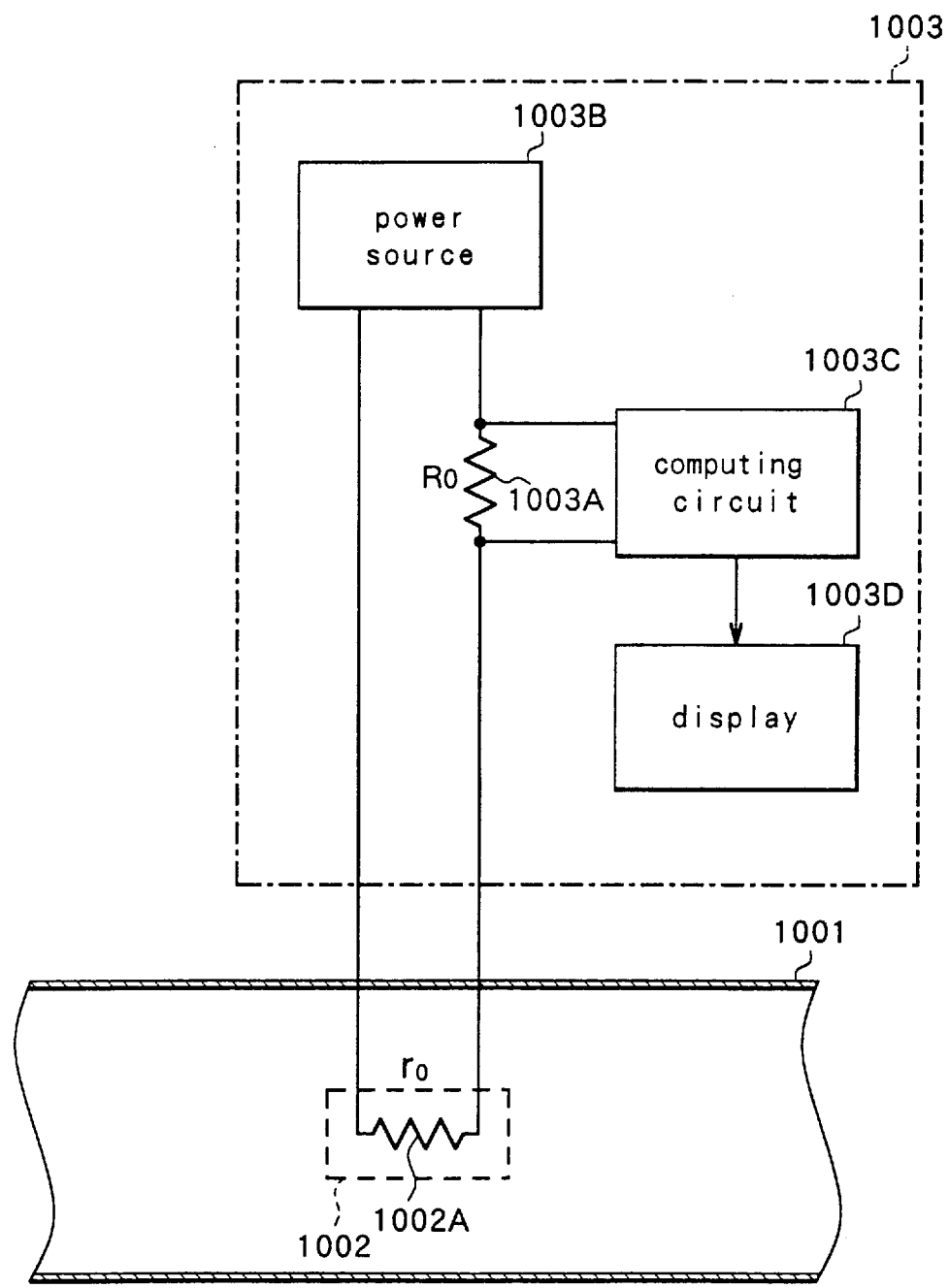
FIG. 3 is a circuit diagram of the flowmeter in FIG. 1.
Figure 4:
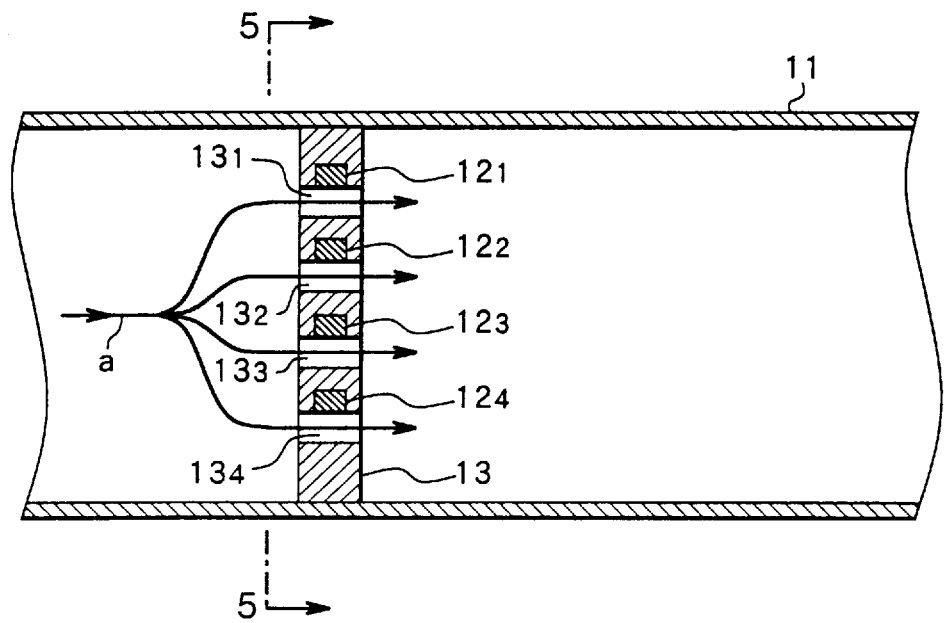
FIG. 4 is a cross-sectional view showing the structure of the flowmeter relating to the first embodiment of the invention.
Figure 5:
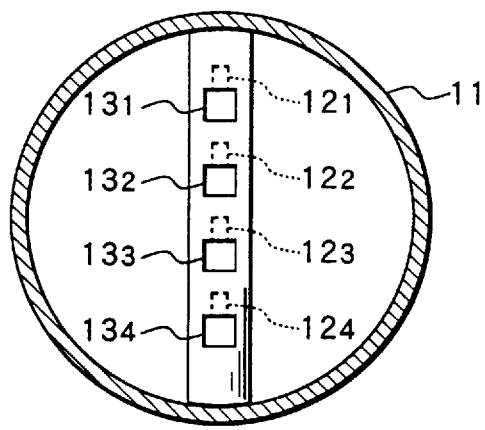
FIG. 5 is a cross-sectional view taken in the direction of arrows B—B in FIG. 4.

FIG. 4 is a schematic drawing of a cross section of the structure of the flowmeter relating to the first embodiment of the invention. FIG. 5 is a cross-sectional view of the structure taken in the direction of arrows B—B in FIG. 4.

The flowmeter of this embodiment comprises a cylindrical sensor unit 13 positioned perpendicular to the flow direction of fluid 'a' at a fixed position in a pipe 11 through which fluid 'a', such as a gas, flows. The sensorunit 13 has four fluid passage holes $13_1$, $13_2$, $13_3$ and $13_4$ along the direction of flow of fluid 'a'. In the sensor unit 13, a plurality of, for example, four flow velocity sensors $12_1$, $12_2$, $12_3$ and $12_4$ are installed at positions facing each of the fluid passage holes $13_1$, $13_2$, $13_3$ and $13_4$ respectively. That is, in the flowmeter of this embodiment, the four flow velocity sensors $12_1$, $12_2$, $12_3$ and $12_4$ are virtically situated in line at multiple positions in the direction perpendicular to the direction of the length of the pipe 11, in particular, multiple positions in the same cross section in the pipe 11.

Figure 6:
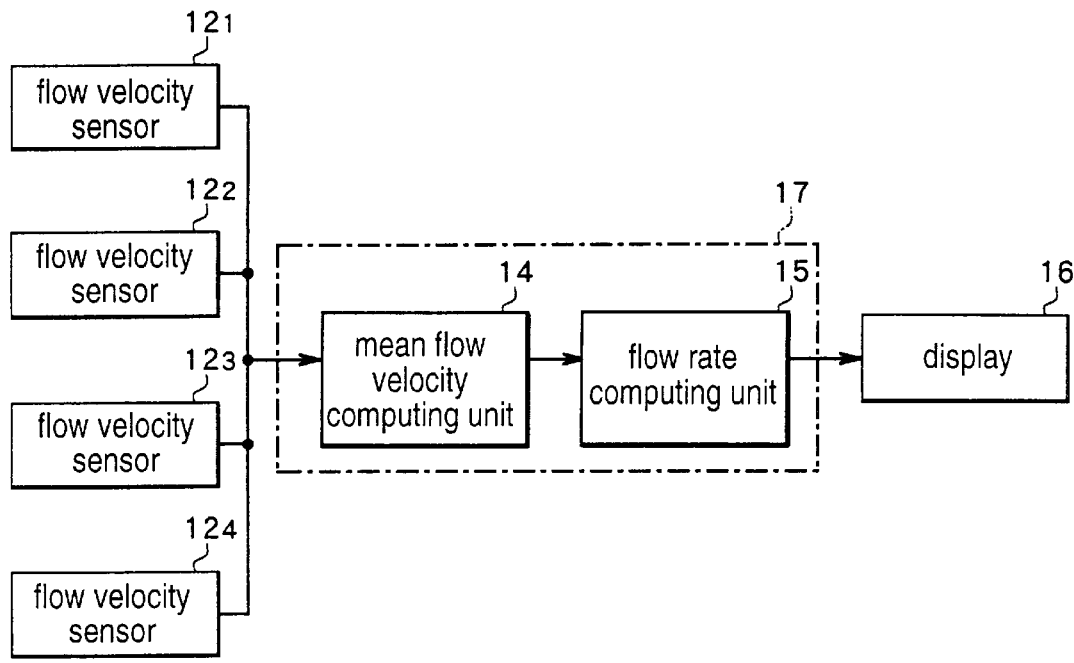
FIG. 6 is a block diagram of the circuit configuration of the flowmeter in FIG. 4.

A detection signal of each of the flow velocity sensors $12_1$, $12_2$, $12_3$ and $12_4$ is inputted to a mean flow velocity computing unit 14, as shown in the block diagram in FIG. 6, where a mean value (Va) of flow velocity measurements is calculated. The mean value (Va) calculated at the mean flow velocity computing unit 14 is converted into a flow rate Q, using equation (4) at a flow rate computing unit 15, and the value is displayed by a display 16. The mean flow velocity computing unit 14 and the flow rate computing unit 15 are implemented via a microcomputer 17.

$$Q = k \times Va \text{ (where } k \text{ is a pipe shape coefficient)} \qquad (4)$$

In the flowmeter of this embodiment, the plural flow velocity sensors $12_1$, $12_2$, $12_3$ and $12_4$ are located in the pipe 11 at different positions along the direction perpendicular to the direction of the length of the pipe 11. The flow velocity sensors $12_1$, $12_2$, $12_3$ and $12_4$ are used to determine the flow rate Q corresponding to the mean value of flow velocity measurements made at the positions where the flow velocity sensors are located. Accordingly, regardless of varied flow velocity distribution in the pipe 11 due to differences in the pipe shapes, flow rates are accurately measured. As a result, flow rates are accurately measured over a wide range.

Figure 7:
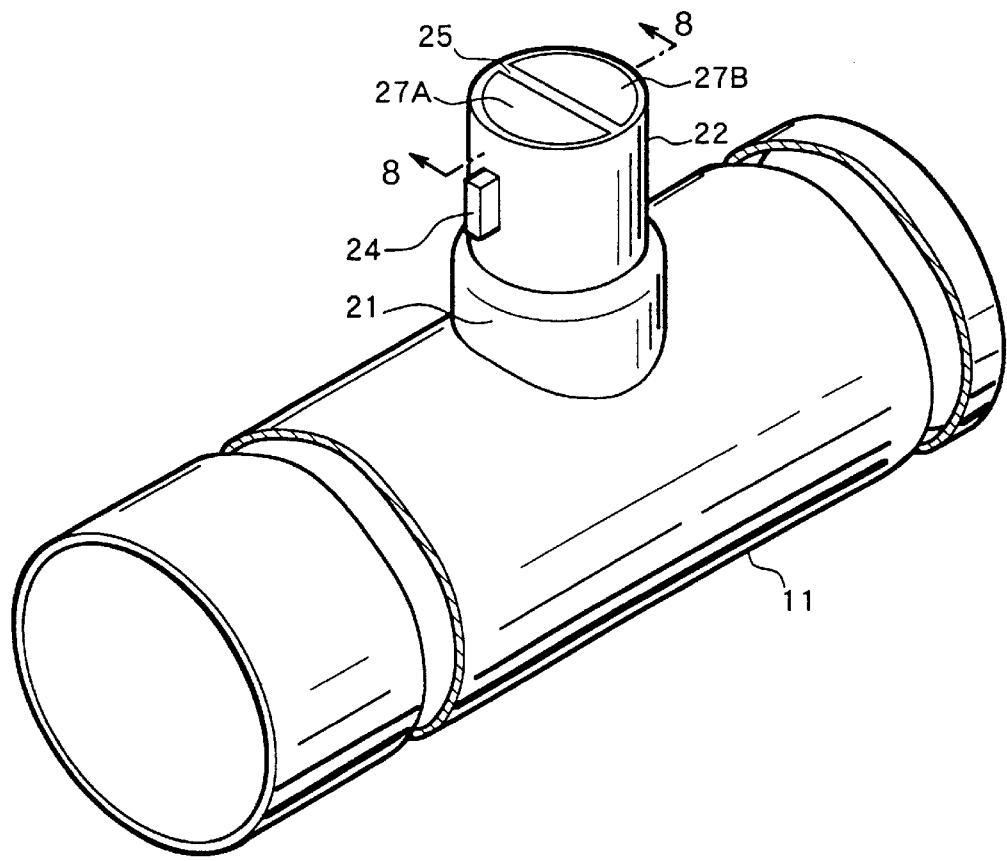
FIG. 7 is a perspective view showing a specific example of the flowmeter in FIG. 4.
Figure 8:
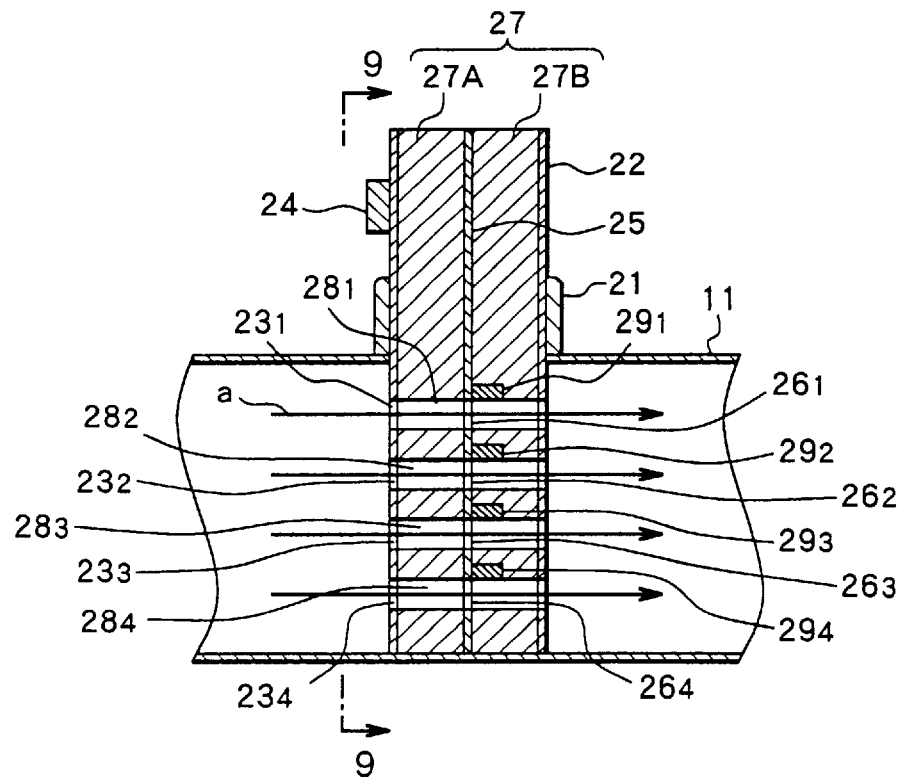
FIG. 8 is a cross-sectional view taken in the directions of arrows C—C in FIG. 7.
Figure 9:
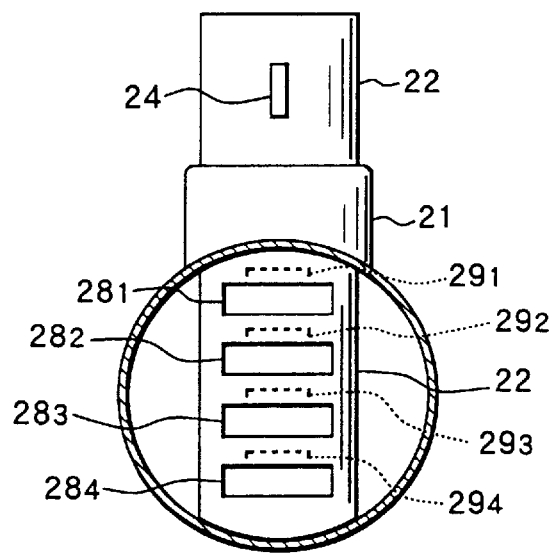
FIG. 9 is a cross-sectional view taken in the directions of arrows D—D in FIG. 8.

FIG. 7 is a perspective view of a specific example of the above-mentioned flowmeter. FIG. 8 is a cross-sectional view taken in the direction of arrows C—C in FIG. 7. FIG. 9 is a cross-sectional view taken in the direction of arrows D—D in FIG. 8. The same reference numbers are assigned to the same components in FIGS. 4, 5 and 6, and their descriptions are omitted.

In the flowmeter, a guide insertion section 21 is provided which penetrates the pipe 11 at any position in the wall along the direction of the length of the pipe 11. A cylindrical guide 22 is to be inserted into the guide insertion section 21. The guide 22 is made of metal, such as steel, or of resin. The guide 22 has a plurality of, for example, four first fluid passage holes $23_1$, $23_2$, $23_3$ and $23_4$ along the flow direction of fluid 'a', in the part inserted into the pipe 11. A plate-shaped partition 25 is placed in the direction of the length inside the hollow body of the guide 22. Semicircular cylindrical unit insertion sections 22a and 22b are located on each side of the partition 25 respectively, as shown in FIG. 7. The partition 25 has four third fluid passage holes $26_1$, $26_2$, $26_3$ and $26_4$ corresponding to the four first fluid passage holes $23_1$, $23_2$, $23_3$ and $23_4$ respectively.

In the part of the guide 22 outside the pipe 11, a plate-shaped alignment indicator 24 is placed along the direction of the length of the first fluid passage holes $23_1$, $23_2$, $23_3$ and $23_4$, that is, the flow direction of fluid 'a'. After the guide 22 is inserted into the guide insertion section 21, the position of the alignment indicator 24 is observed to correctly position the first fluid passage holes $23_1$, $23_2$, $23_3$ and $23_4$ in the flow direction of fluid 'a'. The alignment indicator 24 may be anything capable of determining the installation direction of the guide 22, such as a marking.

A flow velocity sensor unit 27 is to be inserted into the guide 22. The flow velocity sensor unit 27 has a structure of cylindrical member divided into two, which is, for example, made of resin and comprises semicircular cylindrical unit members 27A and 27B. The unit members 27A and 27B have four second fluid passage holes $28_1$, $28_2$, $28_3$ and $28_4$ corresponding to the four fluid passage holes $23_1$, $23_2$, $23_3$ and $23_4$ in the guide 22, respectively. Flow velocity sensors $29_1$, $29_2$, $29_3$ and $29_4$ are placed to face the second fluid passage holes $28_1$, $28_2$, $28_3$ and $28_4$ respectively, in the unit member 27B of the two unit members 27A and 27B, which is placed downstream in the flow direction of fluid 'a'.

Figure 10:
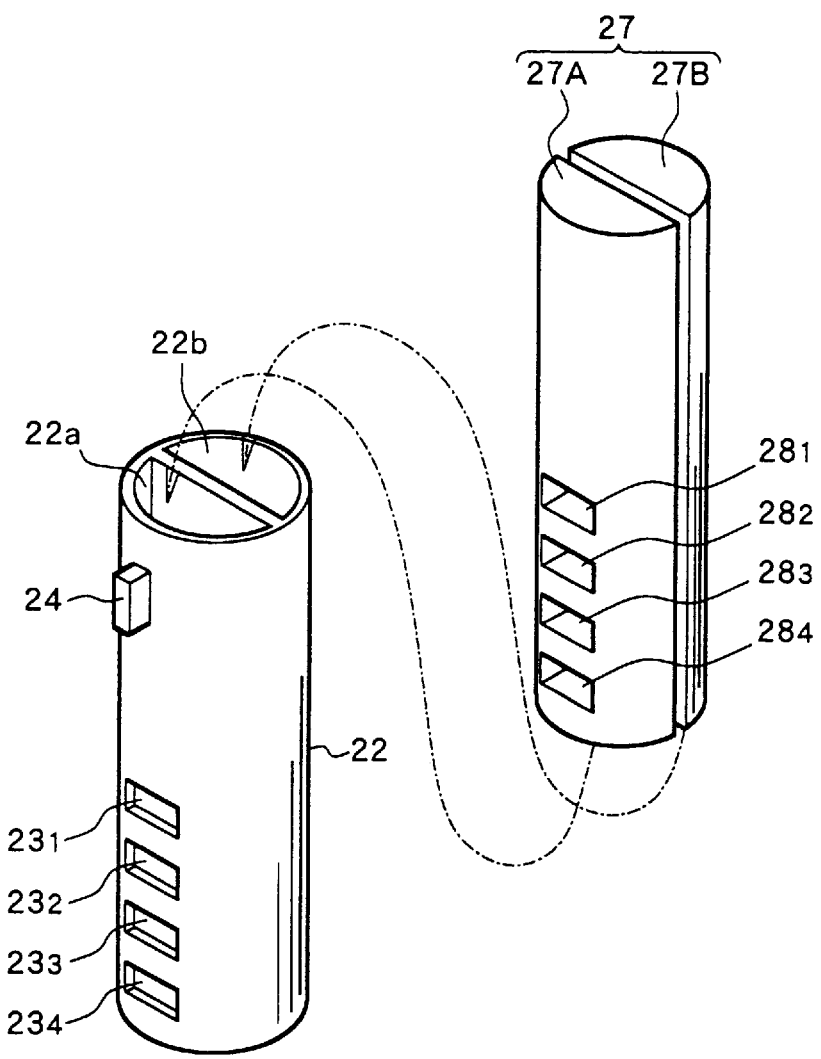
FIG. 10 shows a disassembled perspective view of the guide and the flow velocity sensor units of the flowmeter in FIG. 7.

FIG. 10 shows the installation of the flow velocity sensor unit 27 with the flow velocity sensor unit 27 and the guide 22 separated. The unit member 27A, one of the members of the flow velocity sensor unit 27, is inserted into the unit insertion section 22a of the guide 22; the unit member 27B, the other of the members of the flow velocity sensor unit 27, is inserted into the unit insertion section 27b.

In this embodiment of the invention, part of fluid 'a' flowing in the pipe 11 flows downstream of the guide 22 through the four first fluid passage holes $23_1$, $23_2$, $23_3$ and $23_4$ in the guide 22, the second fluid passage holes $28_1$, $28_2$, $28_3$ and $28_4$ in the flow velocity sensor unit 27, and the third fluid passage holes $26_1$, $26_2$, $26_3$ and $26_4$ in the partition 25. Flow velocity is measured by the flow velocity sensors $29_1$, $29_2$, $29_3$ and $29_4$ during the flow. The mean value of the flow velocity measurements measured by the flow velocity sensors $29_1$, $29_2$, $29_3$ and $29_4$ is calculated by the above-mentioned mean flow velocity computing unit 14. The mean flow velocity is converted into a flow rate by the flow rate computing unit 15, then the calculated flow rate is displayed by the display 16. The rest of fluid 'a' flows downstream through both sides of the guide 22 along the external wall of the guide 22.

In this embodiment of the invention, a mean value is calculated out of flow velocity measurements measured by the flow velocity sensors $29_1$, $29_2$, $29_3$ and $29_4$ which are located at different positions in the same cross section in the pipe 11. As a result, flow velocity is accurately measured, even when flow velocity distribution is not uniform due to varied pipe shapes. Accordingly, flow rates are accurately measured over a wide range. In addition, in this embodiment, fluid 'a' flows smoothly since the external shape of the guide 22 is cylindrical.

Figure 11:
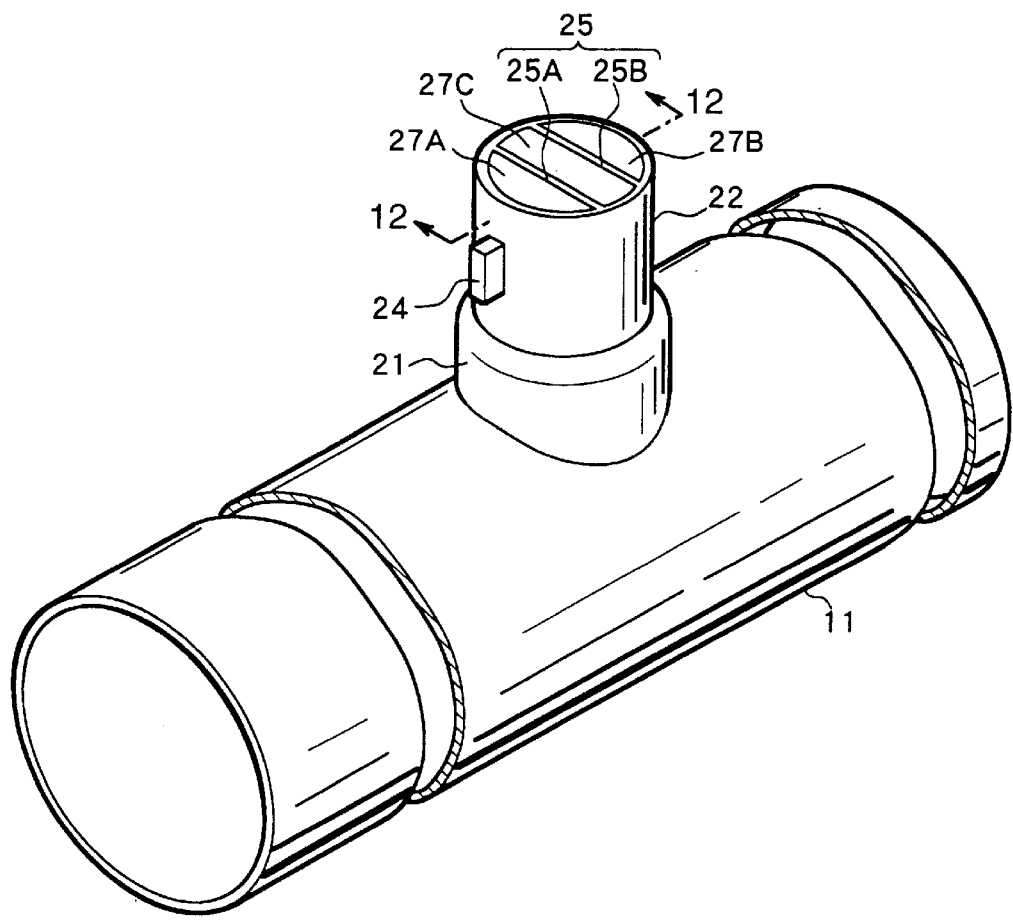
FIG. 11 is a perspective view of another example of the flowmeter in FIG. 4.
Figure 12:
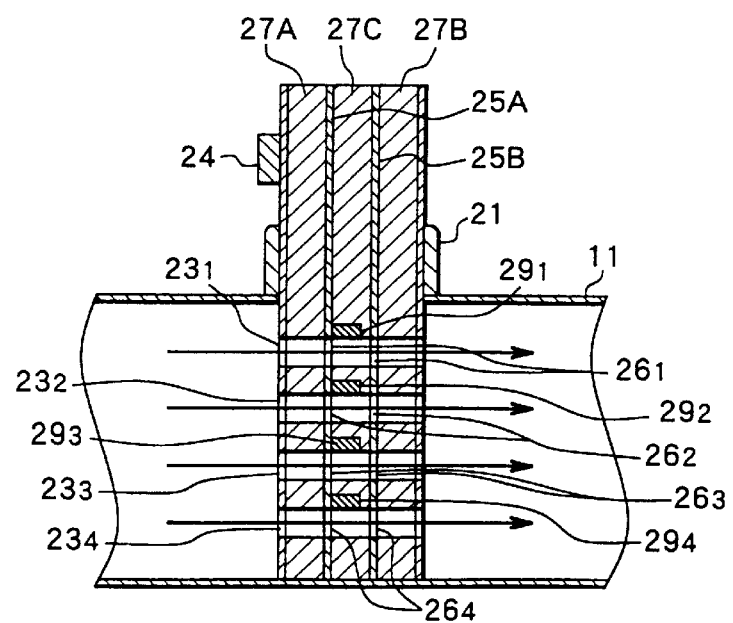
FIG. 12 is a cross-sectional view taken in the directions of arrows E—E in FIG. 11.
Figure 13:
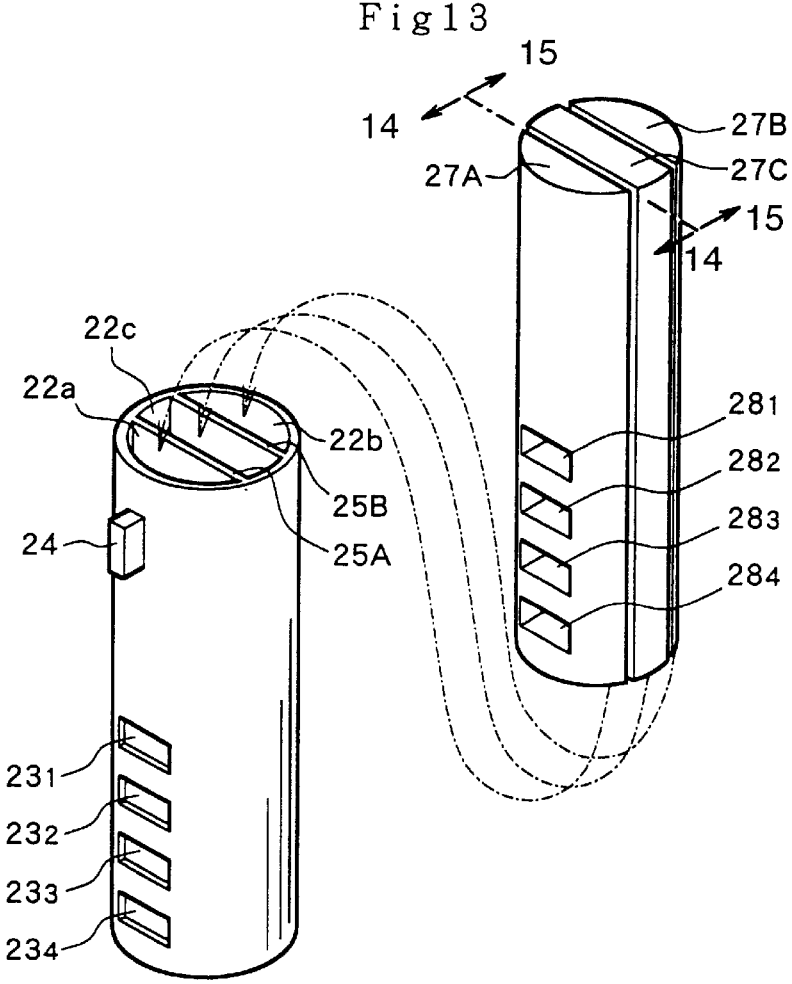
FIG. 13 is a disassembled perspective view of the guide and the flow velocity sensor units in FIG. 11 removed.
Figure 14:
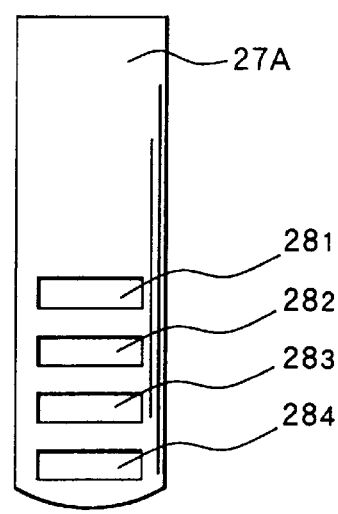
FIG. 14 is a front view taken in the direction of arrows F—F in FIG. 13.
Figure 15:
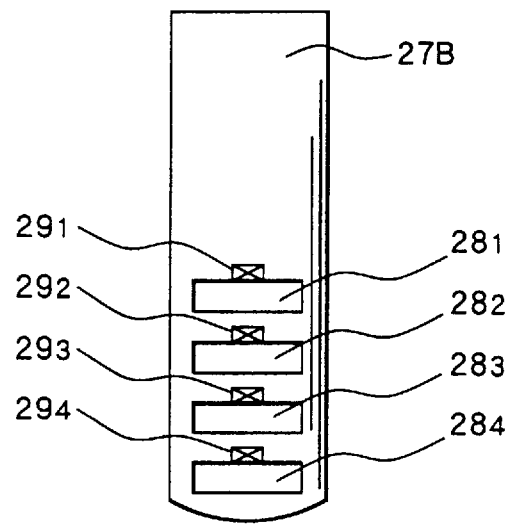
FIG. 15 is a front view taken in the direction of arrows G—G in FIG. 13.

FIG. 11 is a perspective view showing another example of the above-mentioned flowmeter. FIG. 12 is a cross-sectional view taken in the direction of arrows E—E in FIG. 11. FIG. 13 shows the installation of the flow velocity sensor unit 27 with the guide 22 and the flow velocity sensor unit 27 separated. FIG. 14 is a cross-sectional view taken in the direction of arrows F—F in FIG. 13. FIG. 15 is a cross-sectional view taken in the direction of arrows G—G in FIG. 13. The same reference numbers are assigned to the same components in FIGS. 7, 8, 9 and 10, and their descriptions are omitted.

In the flowmeter, two plate-shaped partitions 25A and 25B are formed in the direction of the length inside the hollow body of the guide 22. Unit insertion sections 22a, 22b and 22c are located, divided by the partitions 25A and 25B. The partitions 25A and 25B severally have four third fluid passage holes $26_1$, $26_2$, $26_3$ and $26_4$ corresponding to the first fluid passage holes $23_1$, $23_2$, $23_3$ and $23_4$ respectively, of the guide 22.

The flow velocity sensor unit 27 inserted into the guide 22 has a structure such that the cylindrical section divided into three and comprises three cylindrical unit members 27A, 27B and 27C. The unit members 27A, 27B and 27C severally have four second fluid passage holes $28_1$, $28_2$, $28_3$ and $28_4$ corresponding to the first fluid passage holes $23_1$, $23_2$, $23_3$ and $23_4$ respectively, in the guide 22. The flow velocity sensors $29_1$, $29_2$, $29_3$ and $29_4$ are installed to face the second fluid passage holes $28_1$, $28_2$, $28_3$ and $28_4$ respectively, in the unit member 27C positioned in the center of the direction of flow, among the three unit members 27A, 27B and 27C.

As shown in FIG. 13, the unit member 27A is inserted into the unit insertion section 22a of the guide 22. The unit member 27B is inserted into the unit insertion section 22b of the guide 22. The unit member 27C is inserted into the unit insertion section 22c of the guide 22.

In the flowmeter, as the embodiment described above, part of fluid 'a' flowing in the pipe 11 flows downstream of the guide 22 through the four first fluid passage holes $23_1$, $23_2$, $23_3$ and $23_4$ in the guide 22, the second fluid passage holes $28_1$, $28_2$, $28_3$ and $28_4$ in the flow velocity sensor unit 27, and the third fluid passage holes $26_1$, $26_2$, $26_3$ and $26_4$ in the partitions 25A and 25B. Flow velocity is measured by the flow velocity sensors $29_1$, $29_2$, $29_3$ and $29_4$ during the flow. The subsequent operations are the same as the embodiment described above.

In the flowmeter, too, flow velocity is accurately measured since a mean flow velocity is calculated based on measurements of the flow velocity sensors $29_1$, $29_2$, $29_3$ and $29_4$ which are located at different positions in the same cross section in the pipe 11. Therefore, flow rates are accurately measured over a wide range.

In this embodiment, the unit member 27C, on which the flow velocity sensors $29_1$, $29_2$, $29_3$ and $29_4$ are mounted, is independently formed from the other unit members 27A and 27B. Therefore, the unit member 27C including the flow velocity sensors $29_1$, $29_2$, $29_3$ and $29_4$ may be thinly manufactured with a structure like a printed board.

Figure 16:
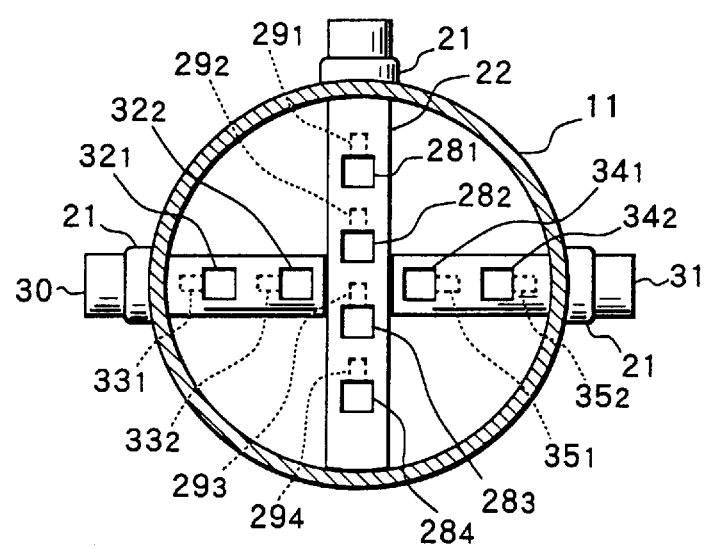
FIG. 16 is a cross-sectional view showing still another structure of the flowmeter in FIG. 4.

FIG. 16 shows still another example of the flowmeter relating to the first embodiment of the invention. In this embodiment another two guides 30 and 31 are installed horizontally in the flowmeter shown in FIGS. 7, 8, 9 and 10. The same reference numbers are used for the same components as FIGS. 7, 8, 9 and 10.

A sensor unit with two first fluid passage holes $32_1$ and $32_2$ and flow velocity sensors $33_1$ and $33_2$, similar to those of the flow velocity sensor unit 27, is inserted into the guide 30. A sensor unit with two first fluid passage holes $34_1$ and $34_2$ and flow velocity sensors $35_1$ and $35_2$, similar to those of the flow velocity sensor unit 27, is inserted into the guide 31 as well.

The guides 30 and 31 are positioned perpendicular to the guide 22 in the flowmeter. A mean flow velocity is calculated from measurements of the eight flow velocity sensors $29_1$, $29_2$, $29_3$, $29_4$, $33_1$, $33_2$, $35_1$ and $35_2$. That is, the number of sensors is larger than that in the above-mentioned embodiment. As a result, flow velocity is more accurately measured and flow rates are accurately measured over a wider range.

Figure 17:
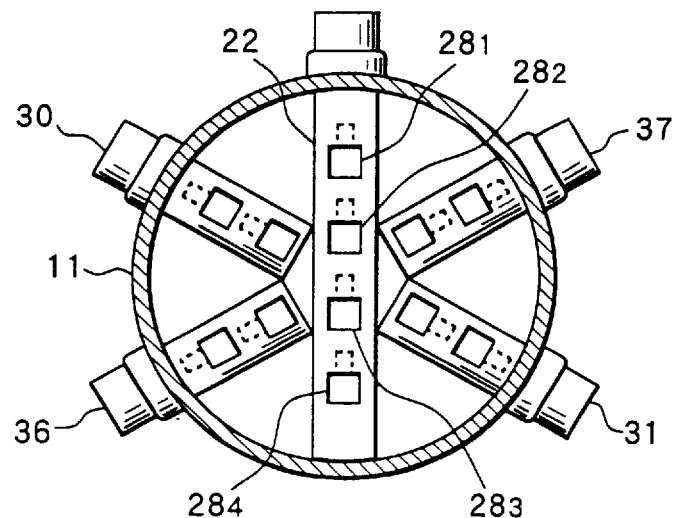
FIG. 17 is a cross-sectional view showing still another structure of the flowmeter in FIG. 4.

In the above-mentioned embodiment, the guides 30 and 31 are positioned perpendicular to the guide 22. As shown in FIG. 17, additional guides 36 and 37 which have the same structure as the guides 30 and 31 may be installed besides the guides 30 and 31. The guides are placed at a 60-degree angle with each other. As a result, the number of flow velocity sensors further increases, which enables more accurate flow velocity measurement and accurate flow rate measurement in a still wider range.

The present invention is not limited to the above-mentioned embodiments. For example, the embodiments of FIGS. 16 and 17 are constructed with the plural fluid passage holes and the plural flow velocity sensors for the plural guides and flow velocity sensor units. However, one fluid passage hole and one flow velocity sensor may be provided for each guide and each flow velocity sensor unit. The flowmeter comprises the plural fluid passage holes and the plural flow velocity sensors in total.

Figure 18:
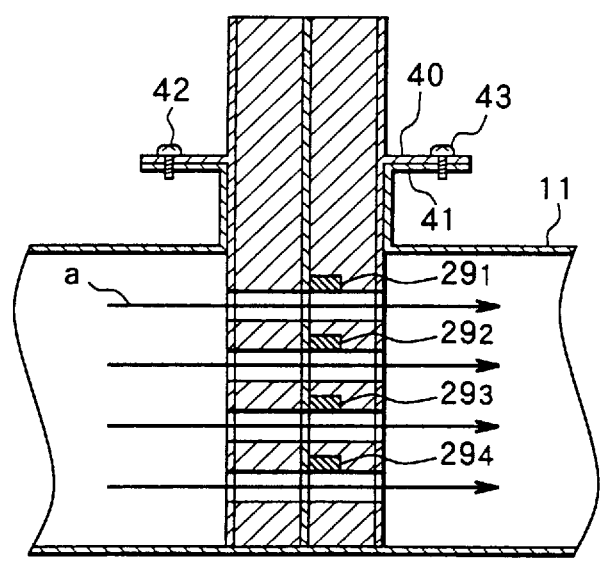
FIG. 18 is a cross-sectional view showing still another structure of the flowmeter in FIG. 4.

In the above-mentioned embodiments, the guide 22 is inserted into a boss (the guide insertion section 21). However, as shown in FIG. 18, flanges 40 and 41 may be provided for the pipe 11 and the guide 22, respectively, and may be fixed with screws 42 and 43. In addition, an O-ring may be inserted between the pipe 11 and the guide 22 to prevent gas leaks.

According to the flowmeter relating to the first embodiment described above, the plural flow velocity sensors are installed in the fluid flow passage within the pipe. Since a mean value of measurements of the flow velocity sensors is determined to calculate the flow rate, an improvement in measurement accuracy and accurate measurement over a wide range of flow rates are expected.

Figure 19:
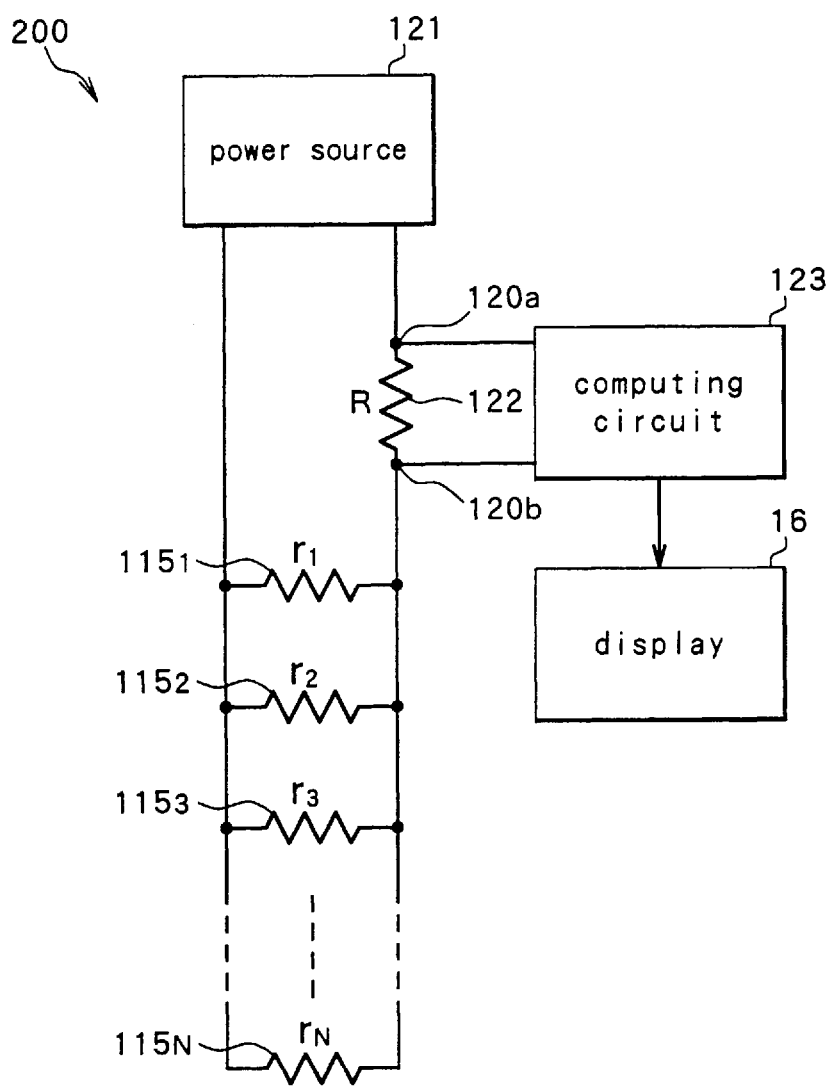
FIG. 19 is a circuit diagram of the flowmeter in FIG. 4.

FIG. 19 is a circuit diagram of the flowmeter shown in FIGS. 4 and 5. To generalize the following descriptions, the number of flow velocity sensors will be expressed as N. As shown in FIG. 19, in the flowmeter of this embodiment, the flow velocity sensors $12_1$, $12_2$, $12_3$, ..., and $12_N$ have hot wires $115_1$, $115_2$, $115_3$, ..., and $115_N$ as heating elements which are heated by electric currents and whose resistances change in response to the temperatures. Here, the hot wires $115_1$, $115_2$, $115_3$, ..., and $115_N$ have resistances of $r_1$, $r_2$, $r_3$, and $r_N$, respectively.

The flowmeter of this embodiment comprises a flow velocity detection circuit 200 whereby the hot wires $115_1$, $115_2$, $115_3$, ..., and $115_N$ are connected in parallel to a shared power source 121. The power source 121 is a stabilized power source generating constant voltage $V_1$. The flow velocity detection circuit 200 has a resistor 122 which is connected between one end of the power source 121 and each one of the ends of the hot wires $115_1$, $115_2$, $115_3$, ..., and $115_N$. Via output terminals 120a and 120b at the ends of the resistor 122, a value is outputted which corresponds to total current 'I' flowing through the hot wires $115_1$, $115_2$, $115_3$, ..., and $115_N$ as the parameter which depends on the mean value of flow velocity measurements measured at the positions of the flow velocity sensors $12_1$, $12_2$, $12_3$, ..., and $12_N$. That is, when the resistance of the resistor 122 is R, the voltage across the output terminals 120a and 120b at both ends of the resistor 122 is (I.R). As a result, the voltage corresponds to the total electric current I.

A computing circuit 123 is connected to the output terminals 120a and 120b, as a flow rate computing means for calculating flow rates of fluid flowing through the pipe 11, based on outputs from the flow velocity detection circuit 200. The display 16 to indicate a flow rate is connected to the computing circuit 123.

The function of the flowmeter will now be described.

The constant voltage $V_1$ from the power source 21 is applied to the hot wire $115_n$ (where n=1, 2, 3, ..., or N) of the flow velocity sensor $12_n$ (where n=1, 2, 3, ..., or N). When the electric current flowing through the hot wire $115_n$ is $i_n$, and $r_n \gg R$, the relationship in equation (5) holds:

$$i_n = V_1/r_n \qquad (5)$$

Since the resistance $r_n$ of the hot wire $115_n$ changes due to flow velocity, the electric current $i_n$ also changes due to the flow velocity. Hence, the flow rate $Q_n$ corresponding to the flow velocity measured at the position of the flow velocity sensor $12_n$ is a function of the electric current $i_n$ and is represented by:

$$Q_n = K_1 \times (i_n - n_0) \qquad (6)$$

where, $i_{n0}$ is the electric current flowing through the hot wire $115_n$ when the flow rate $Q_n$ equals zero, and $K_1$ is a coefficient depending on the pipe and the like. When the hot wire $115_n$ is made of metal, $K_1 > 0$; when the hot wire $115_n$ is a semiconductor, $K_1 < 0$.

Accordingly, flow rate Q, corresponding to the mean value of flow velocity measurements measured at the positions of flow velocity sensors $12_n$, is expressed by:

$$\begin{aligned} Q &= (1/N) \times \Sigma Q_n \\ &= (1/N) \times K_1 \times \Sigma(i_n - i_{n0}) \\ &= (1/N) \times K_1 \times (I - I_0) \end{aligned} \qquad (7)$$

where $\Sigma Q_n$ represents the sum of $Q_1$, $Q_2$, $Q_3$ ..., $Q_N$, $\Sigma(i_n - i_{n0})$ represents the sum of $i_1 - i_{10}$, $i_2 - i_{20}$, $i_3 - i_{30}$, ... $i_N - i_{N0}$, and $I_0$ is the sum of electric currents flowing through the hot wires $115_1$, $115_2$, $115_3$, ..., $115_N$ when the flow rate Q equals zero.

Electric current I in equation (7) is determined from the voltage across the output terminals 120a and 120b, at both ends of the resistor 122 as described above. Therefore, the computing circuit 123, shown in FIG. 19, calculates the flow rate Q based on equation (7). Accordingly, the computing circuit 123 finds the flow rate Q corresponding to the mean value of flow velocity measurements measured at the positions of the flow velocity sensors $12_n$. The flow rate Q determined by the computing circuit 123 is displayed by the display 16.

The flowmeter has the flow velocity detection circuit 200 wherein the hot wires $115_n$ of the flow velocity sensors $12_n$ are connected in parallel to the shared power source 21. The flow velocity detection circuit 200 outputs a value corresponding to the sum 'I' of electric currents flowing through the hot wires $115_n$ as the parameter which depends on the mean value of flow velocity measurements measured at the positions of the flow velocity sensors $12_n$. Based on the output from the flow velocity detection circuit 200, the flow rate Q of fluid flowing through the pipe 11 is calculated. Accordingly, the flowmeter does not require circuits which calculate flow velocity of each of the plural flow velocity sensors and the mean value thereof. Thus the structure of the flowmeter is simplified.

Figure 20:
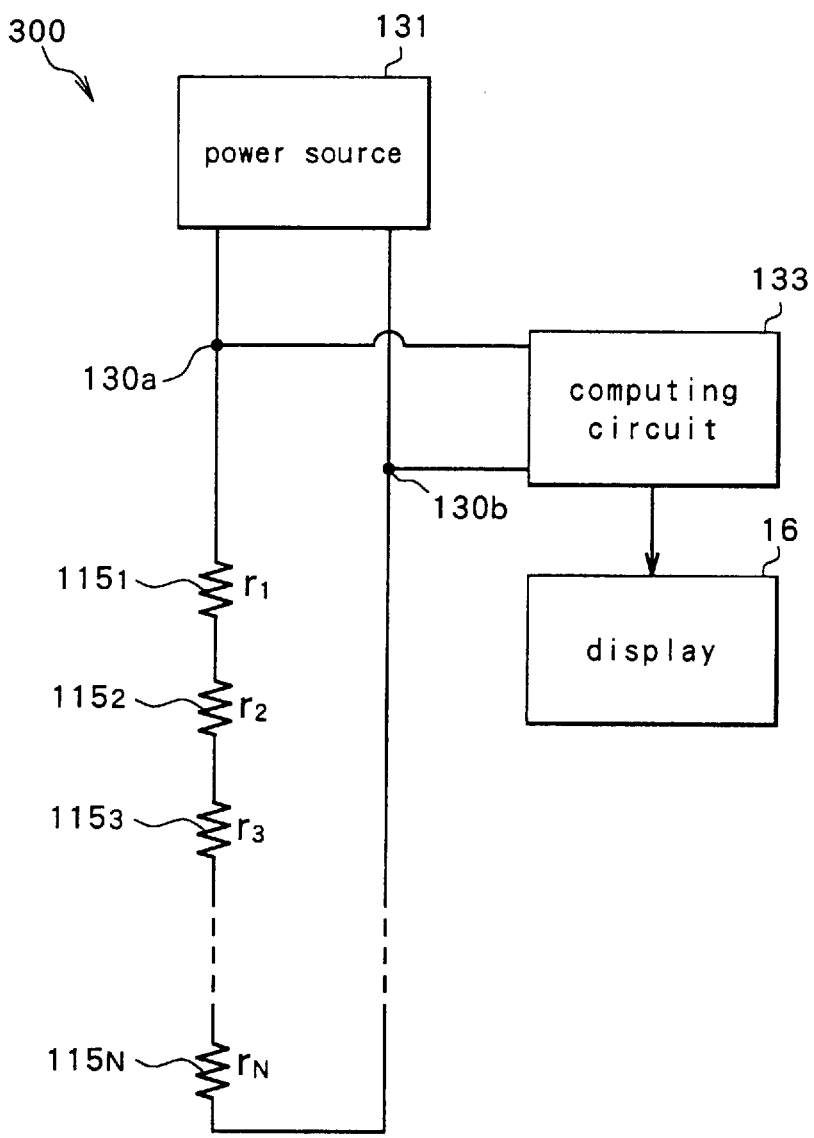
FIG. 20 is a circuit diagram of another circuit design of the flowmeter in FIG. 4.

FIG. 20 is a circuit diagram showing another structure of the flowmeter shown in Fugures 4 and 5.

In the flowmeter of this embodiment, instead of the flow velocity detection circuit 200 in FIG. 19, a flow velocity detection circuit 300 is provided wherein the hot wires $115_n$ are connected in series to the shared power source 131. The power source 131 is a constant current source which supplies a constant electric current $l_0$.

Through the output terminals 130a and 130b, the flow velocity detection circuit 300 outputs the supply voltage $V_2$ of the power source 131, which corresponds to the sum of resistances of the hot wires $115_n$, as the parameter which depends on the mean value of flow velocity measurements measured at the positions of the flow velocity sensors $12_n$. Instead of the computing circuit 123 shown in FIG. 19, a computing circuit 133 is connected to the output terminals 130a and 130b of the flow velocity detection circuit 300 in the flowmeter. The display 16 is connected to the computing circuit 133.

The function of the flowmeter will now be described.

The power source 131 supplies a constant current $I_0$ to the hot wire $115_n$ (where n=1, 2, 3, . . . , or N) of the flow velocity sensor $1_n$ (where n=1, 2, 3, . . . , or N). Here, the resistance $r_n$ (where n=1, 2, 3, . . . , or N) of the hot wire $115_n$ changes due to flow velocity; therefore, the sum of the resistances $\Sigma r_n$ of the hot wires $15_n$ changes as well due to the flow velocity. Thus the sum of the resistances $\Sigma r_n$ is the parameter which depends on the mean value of flow velocity measurements measured at the positions of the flow velocity sensors $12_n$.

The flow rate Q corresponding to the mean value of flow velocity measurements measured at the positions of the flow velocity sensors $12_n$ is expressed by:

$$Q = K_2 \times (1/N) \times \Sigma(r_n - r_{n0}) \quad (8)$$
$$= K_2 \times (1/N) \times (V_2 - V_{20})/I_0$$

where $r_{n0}$ is the resistance of the hot wire $115_n$ when the flow rate Q equals zero, and $V_{20}$ is the voltage across the output terminals 130a and 130b, when the flow rate Q equals zero. $K_2$ is the coefficient corresponding to the pipe, where $K_2 < 0$ when the hot wire $115_n$ is made of metal, and $K_2 > 0$ when the hot wire $115_n$ is a semiconductor.

The voltage $V_2$ in equation (8) is determined as a voltage across the output terminals 130a and 130b, as described above. Therefore, the computing circuit 133 in FIG. 20 calculates the flow rate Q based on equation (8). Accordingly, the computing circuit 133 determines the flow rate Q corresponding to the mean value of flow velocity measurements measured at the positions of the flow velocity sensors $12_n$. The flow rate Q determined by the computing circuit 133 is displayed by the display 16.

According to the flowmeters shown in FIGS. 19 and 20 as described above, the plural flow velocity sensors are installed in the pipe at multiple different positions in the direction perpendicular to the direction of the length of the pipe. The heating elements of the flow velocity sensors are connected in parallel or in series to the shared power source. The flow velocity detection circuit is provided to output the parameter which depends on the mean value of flow velocity measurements measured at the positions where the flow velocity sensors are installed. A flow rate of fluid flowing through the pipe is calculated based on outputs of the flow velocity detection circuit. As a result, the flowmeter with a simple structure enables accurate flow rate measurement regardless of flow velocity distribution in the pipe.

The second embodiment of the present invention will now be described.

A typical flow velocity sensor is generally applied to measurement of minute flow rates of no more than 300 to 350 liters/hour. Measurement accuracy is reduced when flow rates are above this range. Consequently, the flowmeter of the invention with the plural flow velocity sensors eliminates inaccurate measurements caused by nonuniform flow velocity distribution in a low flow rate range, which improves measurement accuracy. On the other hand, the flowmeter of the invention is not sufficient for measurement of a high flow rate range.

The flowmeter relating to the second embodiment of the invention improves measurement accuracy in a low flow rate range as well as in a high flow rate range. Thus, a wider range of flow rate measurement is achieved. The same reference numbers are assigned to the same components as the first embodiment of the invention.

Figure 21:
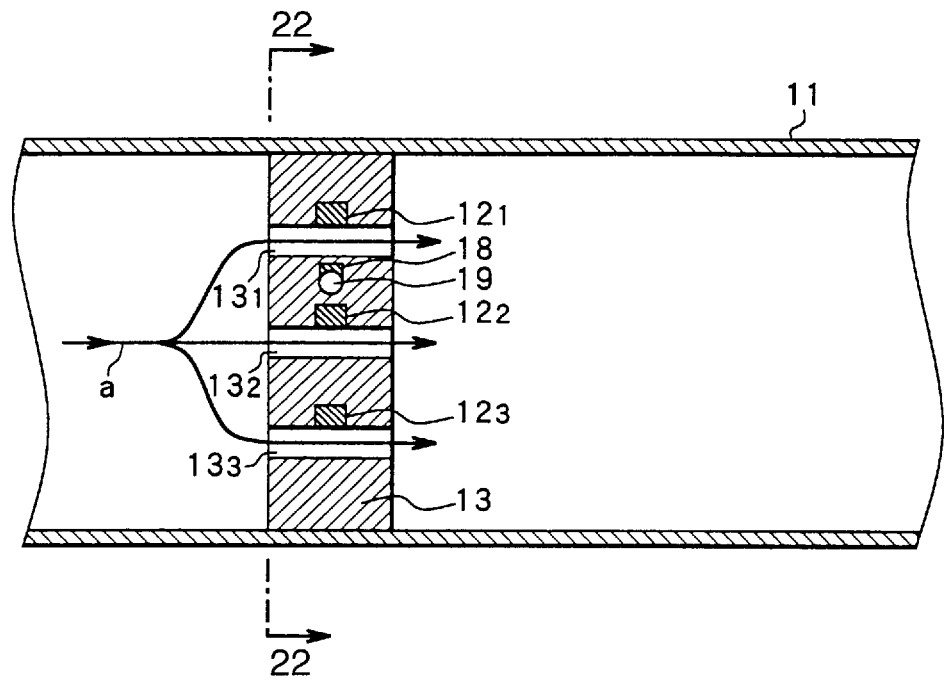
FIG. 21 is a cross-sectional view of the structure of the flowmeter relating to the second embodiment of the invention.
Figure 22:
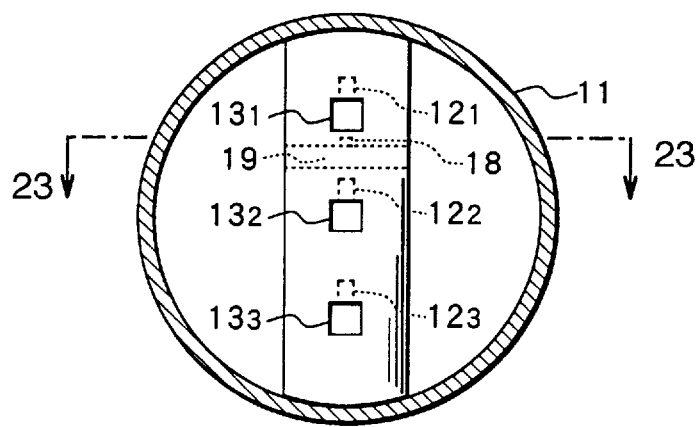
FIG. 22 is a cross-sectional view taken in the direction of arrows H—H in FIG. 21.

FIG. 21 shows a cross-sectional view of the structure of the flowmeter. FIG. 22 shows the structure viewed in the direction of arrows H—H in FIG. 21. Furthermore, FIG. 23 shows the structure viewed in the direction of arrows I—I in FIG. 22.

The flowmeter of this embodiment has the cylindrical sensor unit 13 as the sensor holder positioned perpendicular to the direction of flow of fluid 'a' at a fixed position in the pipe 11 through which fluid 'a', such as a gas, passes. The sensor unit 13 has three fluid passage holes $13_1$, $13_2$ and $13_3$ positioned at equal intervals in the flow direction of fluid 'a'. The plural, for example, three flow velocity sensors $12_1$, $12_2$ and $12_3$ for a low flow rate range are positioned to face the fluid passage holes $13_1$, $13_2$ and $13_3$, respectively, in the sensor unit 13. The components and the structure described here are the same as the first embodiment (FIG. 4).

Figure 23:
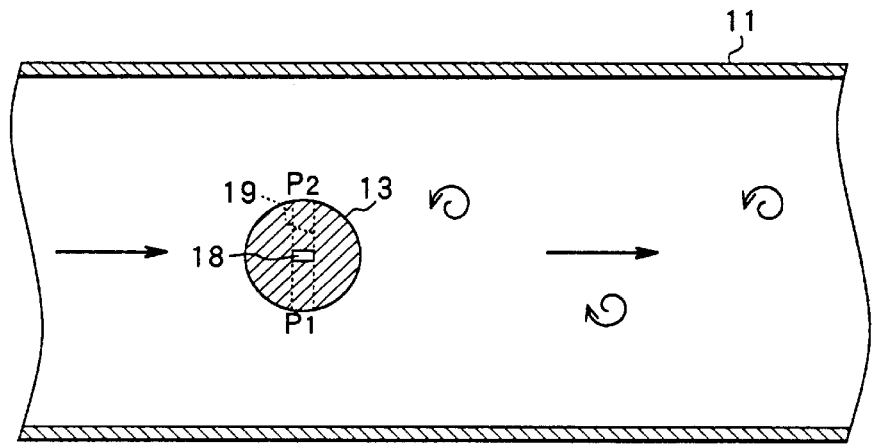
FIG. 23 is a cross-sectional view taken in the direction of arrows I—I in FIG. 22.

Since the cylindrical sensor unit 13 is installed in the gas flow passage in the flowmeter, regular vortices are alternately produced from both sides of the sensor unit 13 as shown in FIG. 23 when the Reynolds number (Re) exceeds or equal to a certain value. Thus a vortex street called a Karman vortex street is produced downstream of the sensor unit 13. The number of vortices produced at a side of the sensor unit 13 within a unit time is approximately proportional to flow velocity in a wide range of Reynolds numbers; the relationship between the two is expressed by:

$$St = f \cdot d/v \quad (9)$$

where, St is the Strouhal number, f is the vortex frequency, d is the width of the sensor unit 13, and v is the flow velocity.

Therefore, in this embodiment, a vortex detection sensor is provided as the flow rate detection means for a high flow rate range. More specifically, the through hole 19 is provided between, for example, the fluid passage holes $13_1$ and $13_2$ of the sensor unit 13 to intersect the fluid passage holes $13_1$ and $13_2$. A vortex detection sensor 18 (a piezoelectric film sensor in this embodiment) is located to face the center of the through hole 19. The vortex detection sensor 18 detects a differential in gas pressures ($P_1-P_2$) (where $P_1$ and $P_2$ are pressures on both sides of the through hole 19) which arises due to generation of a Karman vortex street. The flow velocity and flow rate are calculated based on the output of the vortex detection sensor 18 because the output of the vortex detection sensor 18 (the pressure differential) is proportional to the number of vortices (the vortex frequency).

Figure 24:
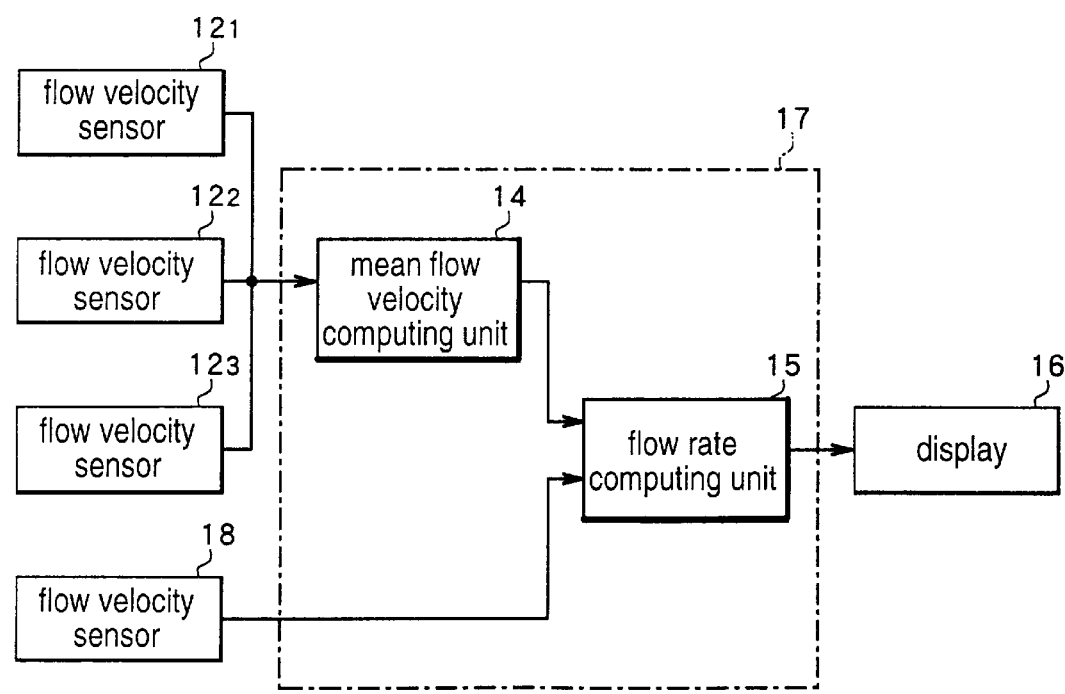
FIG. 24 is a block diagram showing the circuit configuration of the control unit of the flowmeter in FIG. 21.

FIG. 24 shows a circuit diagram of a control unit of the flowmeter relating to this embodiment. Each detection signal from the flow velocity sensors $12_1$, $12_2$ and $12_3$ is inputted to the mean flow velocity computing unit 14 where a mean value (Va) of flow velocity measurements is calculated. The mean flow rate (Va) calculated at the mean flow velocity computing unit 14 and the value detected by the vortex detection sensor 18 are inputted to the flow rate computing unit 15. In a low flow rate range, the flow rate computing unit 15 calculates the flow rate (Q) by using equation (4), based on the mean flow rate (Va) calculated by the mean flow velocity computing unit 14. In a high flow rate range, the flow rate computing unit 15 determines flow velocity based on the value detected by the vortex detection sensor 18 and calculates the flow rate (Q). The flow rate calculated in the flow rate computing unit 15 is displayed by the display 16.

That is, in the flowmeter of this embodiment, the three flow velocity sensors $12_1$, $12_2$ and $12_3$ for a low flow rate range and the vortex detection sensor 18 for a high flow rate range are combined with the sensor unit 13. Consequently, in a low flow rate range where flow rates are less than a certain level, flow velocity measurements at multiple positions in the same cross section are measured by the flow velocity sensors $12_1$, $12_2$ and $12_3$. The mean value of the measurements is calculated by the mean flow velocity computing unit 14. Then, the flow rate computing unit 15 determines the flow rate based on the mean flow velocity. On the other hand, in a high flow rate range, the vortex detection sensor 18 detects the Karman vortex frequency, that is, the number of vortices, generated by fluid 'a' passing both sides of the sensor unit 13. Then, the flow rate computing unit 15 calculates the flow rate based on the detected result. Therefore, in a low flow rate range, measurement accuracy improves and a wide range of flow rates can be measured, compared to a conventional flowmeter which uses one flow velocity sensor to measure flow velocity only in the center of the flow passage. Furthermore, the vortex detection sensor 18 is capable of measuring flow rates even in a high flow rate range. Overall, a wider range of flow rates is accurately measured.

Figure 25:
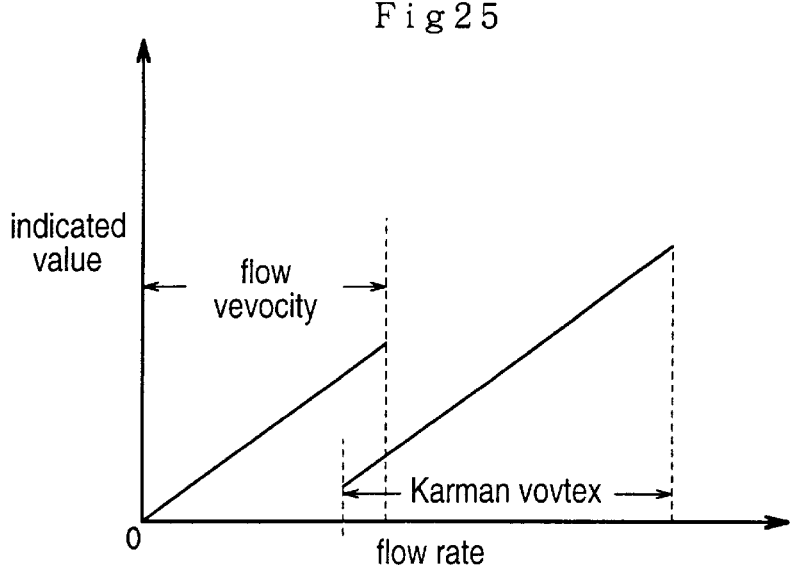
FIG. 25 shows an application range of outputs of the flow velocity sensor and the vortex detection sensor.

The range measurable by the flow velocity sensors $12_1$, $12_2$ and $12_3$ and that of the vortex detection sensor 18 partly overlap with each other as shown in FIG. 25. In the overlapping range, a flow rate may be determined from one of the outputs, or may be calculated from both outputs, for example, taking the average of the values given by the two outputs. Furthermore, measurements obtained by the flow velocity sensors $12_1$, $12_2$ and $12_3$ may be calibrated based on measurements by the vortex detection sensor 18.

The second embodiment of the present invention described above may be practiced in still other ways without departing from the spirit or essential character thereof.

Figure 26:
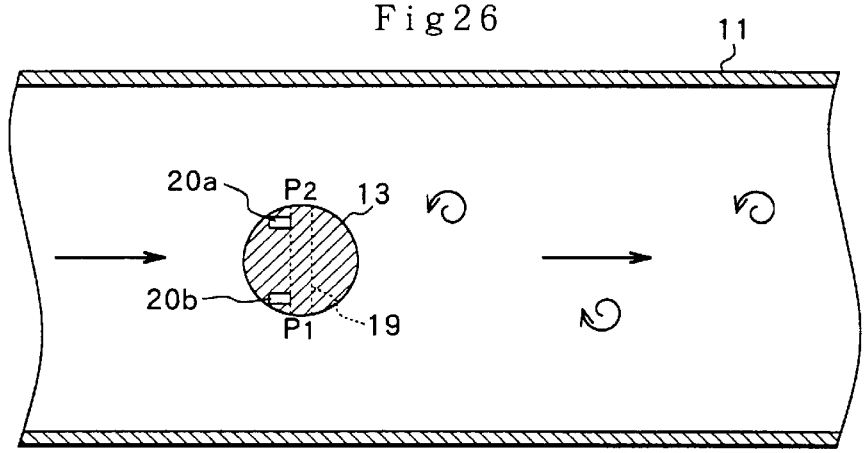
FIG. 26 is a perspective view of another structure of the main components of the flowmeter in FIG. 21.

For example, in the above embodiment, the through hole 19 is provided in the sensor unit 13. One vortex detection sensor 18 (a piezoelectric film sensor) is installed at the position facing the center of the through hole 19. The pressure differential ($P_1$–$P_2$) between both sides of the sensor unit 13 is detected by the vortex detection sensor 18. Instead, as shown in FIG. 26, pressure sensors 20a and 20b may be installed at each end of the through hole 19 respectively to independently detect the pressures $P_1$ and $P_2$ at both sides of the sensor unit 13. The flow rate computing unit 15 calculates a flow rate based on the outputs from the pressure sensors 20a and 20b.

Figure 27:
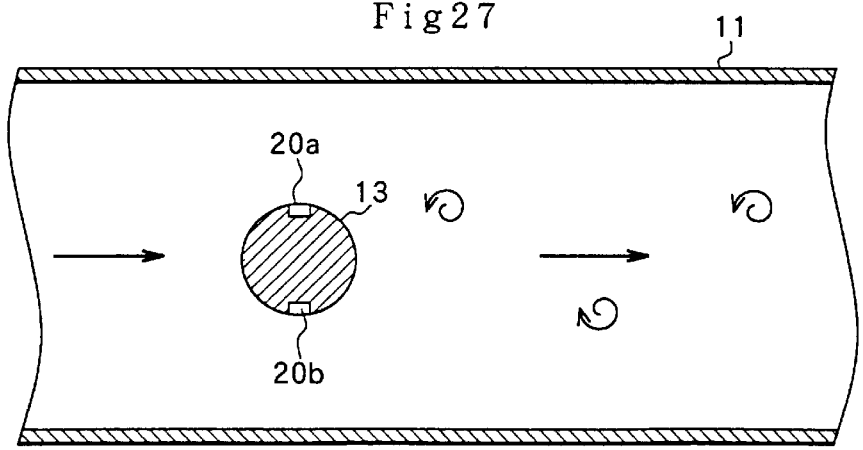
FIG. 27 is a perspective view of still another structure of the main components of the flowmeter in FIG. 21.

Furthermore, as shown in FIG. 27, the pressure sensors 20a and 20b may be installed at both ends of the sensor unit 13 without the through hole. The flow rate computing unit 15 calculates a flow rate based on outputs of the pressure sensors 20a and 20b.

The present invention is not limited to measurement of flow rates of gaseous bodies such as a gas, but may be applied to a flowmeter for measuring flow rates of liquid.

According to the flowmeter of the second embodiment of the invention described above, the cylindrical sensor holder is installed perpendicular to the direction of the length in the pipe. The sensor holder has the plural flow velocity sensors which detect flow velocity of fluid, and the vortex detection sensor which detects the frequency of a Karman vortex street generated by passing fluid. In a low flow rate range, a mean flow velocity is determined from measurements obtained by the plural flow velocity sensors. Then, based on the mean flow velocity, a flow rate is calculated. On the other hand, in a high flow rate range, a flow rate is calculated based on the result detected by the vortex detection sensor. Thus, measurement accuracy in a low flow rate range significantly improves, compared to a conventional flowmeter which measures flow velocity only in the center of a flow passage by one flow velocity sensor. Flow rates over a wide range are measured as well. In a high flow rate range, flow rates are measured by the vortex detection sensor. Overall, a wider range of flow rates are measured.

INDUSTRIAL APPLICABILITY

As described above, the flowmeter of the invention provides highly improved measurement accuracy over a wider range of flow rate, which is ideal for applications such as gas meters.

What is claimed is:

1. A flowmeter comprising:
   a) at least one guide insertion section passing through the wall of a pipe along the direction of the length of the pipe at any position of the wall;
   b) at least one guide inserted into the pipe via said guide insertion section;
   c) at least one flow velocity sensor unit installed in said guide;
   d) a plurality of flow velocity sensors installed in said flow velocity sensor unit, each of which is installed at a different position in the same cross section perpendicular to the direction of the length of the pipe and detects flow velocity of fluid;
   e) a mean flow velocity computing means for calculating the mean value of flow velocity measurements measured at the multiple positions with the output signals of said plural flow velocity sensors as inputs; and
   f) a flow rate computing means for calculating a flow rate of fluid based on the result calculated by said mean flow velocity computing means.

2. A flowmeter comprising:
   a) a guide insertion section passing through the wall of a pipe along the direction of the length of the pipe at any position of the wall;
   b) a hollow guide inserted into the pipe via said guide insertion section, having a plurality of first fluid passages along the direction of fluid flow;
   c) a flow velocity sensor unit inserted into said hollow guide, having a plurality of second fluid passages corresponding to said plurality of first fluid passages of said guide and having a plurality of flow velocity sensors mounted to face said plurality of second fluid passages;
   d) a mean flow velocity computing means for calculating the mean value of flow velocity measurements measured at the multiple positions in a fluid flow passage with the output signals from said plurality of flow velocity sensors in said flow velocity sensor unit as inputs; and
   e) a flow rate computing means for calculating a flow rate of fluid based on the result calculated by said mean flow velocity computing means.

3. A flowmeter comprising:
   a) a plurality of guide insertion sections passing through the wall of a pipe in the same cross section perpendicular to the direction of the length of the pipe;
   b) a plurality of hollow guides each of which is inserted into the pipe via each of said guide insertion sections and has at least one first fluid passage along the direction of fluid flow;
   c) a plurality of flow velocity sensor units each of which is inserted into each of said guides and has at least one second fluid passage corresponding to said first fluid passage in said guides, and has at least one flow velocity sensor facing said second fluid passage;

d) a mean flow velocity computing means for calculating the mean value of flow velocity measurements measured at the multiple positions in a fluid flow passage, with the output signals from said plural flow velocity sensors in said flow velocity sensor units as inputs; and e) a flow rate computing means for calculating a flow rate of fluid based on the result calculated by said mean flow velocity computing means.

4. A flowmeter according to claim 2 wherein each of said guides is formed into a cylindrical shape.

5. A flowmeter according to claim 4 wherein:

a) each of said guides has one partition in the hollow interior thereof which has at least one third fluid passage corresponding to said first fluid passage along the direction of the length of said guide, and has semicircular cylindrical unit insertion sections each of which is located on each side of said partition; and b) each of said flow velocity sensor units has two semicircular cylindrical unit members which are capable of being inserted into said unit insertion sections of said guides respectively, and each of said semicircular cylindrical unit members has at least one second fluid passage facing said third fluid passage and has a flow velocity sensor corresponding to said second fluid passage of one of said semicircular cylindrical unit members which is located downstream.

6. A flowmeter according to claim 4 wherein:

a) each of said guides has two partitions in the hollow interior thereof, each of which has at least one third fluid passage corresponding to said first fluid passages along the direction of the length, and each of said guides has three unit insertion sections divided by said partitions; and b) each of said flow velocity sensor units has three unit members which are capable of being inserted into said unit insertion sections of said guide and each of said unit members has at least one second fluid passage facing said third fluid passage, and has a flow velocity sensor corresponding to said second fluid passage of one of said unit members located in the center in the direction of flow.

7. A flowmeter according to claim 2 wherein an alignment indicator is Provided on the external wall of said guide corresponding to said first fluid passage hole to match the installation direction of said guide.

8. A flowmeter comprising:

a) a plurality of flow velocity sensors installed in a pipe at multiple different positions in the direction perpendicular to the direction of the length of the pipe, each of which has a heating element which is heated by an electric current and changes its resistance in response to its temperature;

b) a flow velocity detection circuit which allows said heating elements of said flow velocity sensors to be connected in parallel to a shared constant-voltage power source and outputs a value corresponding to the sum of electric currents flowing through said heating elements as a parameter depending on a mean value of flow velocity measurements measured at installation positions of said flow velocity sensors; and c) a flow rate computing means for calculating a flow rate of fluid flowing through the pipe, based on the output from said flow velocity detection circuit.

9. A flowmeter comprising:

a) a cylindrical sensor holder installed to be perpendicular to the direction of the length of a pipe, generating a Karman vortex street in passing fluid having a plurality of flow velocity sensors which detect flow velocity of fluid and a vortex detection sensor which detects the frequency of said Karman vortex street;

b) a mean flow velocity computing means for calculating the mean value of flow velocity measurements measured at the multiple positions, based on the outputs of said plural flow velocity sensors; and c) a flow rate computing means for determining flow rate of fluid based on the result calculated by said mean flow velocity computing means in a low flow rate range and determining a flow rate of fluid based on the result detected by said vortex detection sensor in a high flow rate range.

10. A flowmeter according to claim 9 wherein said sensor holder comprises a cylindrical member having a plurality of fluid passages in the direction of fluid flow and a through hole intersecting said fluid passages, and wherein said plural flow velocity sensors are located to face said fluid passsages respectively, and said vortex detection sensor is a pressure sensor or a pair thereof, facing said through hole and located at a position so as to detect a pressure differential between both sides of said cylindrical member due to generation of vortices.

11. A flowmeter according to claim 9 wherein said sensor holder comprises a cylindrical member having a plurality of fluid passages in the direction of fluid flow, and wherein said plural flow velocity sensors are positioned to face said fluid passages respectively, and said vortex detection sensor is a pair of pressure sensors located at a position so as to detect a pressure differential between both sides of said cylindrical member due to generation of vortices.

12. A flowmeter according to claim 3 wherein each of said guides is formed into a cylindrical shape.

13. A flowmeter according to claim 12 wherein:

a) each of said guides has one partition in the hollow interior thereof which has at least one third fluid passage corresponding to said first fluid passage along the direction of the length of said guide, and has semicircular cylindrical unit insertion sections each of which is located on each side of said partition; and b) each of said flow velocity sensor units has two semicircular cylindrical unit members which are capable of being inserted into said unit insertion sections of said guides respectively, and each of said semicircular cylindrical unit members has at least one second fluid passage facing said third fluid passage and has a flow velocity sensor corresponding to said second fluid passage of one of said semicircular cylindrical unit members which is located downstream.

14. A flowmeter according to claim 12 wherein:

a) each of said guides has two partitions in the hollow interior thereof, each of which has at least one third fluid passage corresponding to said first fluid passages along the direction of the length, and each of said guides has three unit insertion sections divided by said partitions; and b) each of said flow velocity sensor units has three unit members which are capable of being inserted into said unit insertion sections of said guide and each of said unit members has at least one second fluid passage facing said third fluid passage, and has a flow velocity sensor corresponding to said second fluid passage of one of said unit members located in the center in the direction of flow.

15. A flowmeter according to claim 3 wherein an alignment indicator is provided on the external wall of said guide corresponding to said first fluid passage to match the installation direction of said guide.

* * * * *

UNITED STATES PATENT AND TRADEMARK OFFICE
CERTIFICATE OF CORRECTION

PATENT NO. : 5,861,556
DATED : January 19, 1999
INVENTOR(S) : Kazumitsu Nukui; Toshiharu Saito; Tkudai Neda It is certified that error appears in the above-identified patent and that said Letters Patent is hereby corrected as shown below:

In the Title Page, after line 7, insert

--[30]    Foreign Application Priority Data

| Jun. 3, 1994 | [JP] | Japan | 6-144035 |
| Jun. 20, 1994 | [JP] | Japan | 6-160664 |
| Jun. 20, 1994 | [JP] | Japan | 6-160665 |
| Jun. 1, 1995 | [WO] | WIPO | PCT/JP95/01070- |

Col. 5,   line 9, delete "A-A" and substitute therefor --2-2--;
          line 15, delete "B-B" and substitute therefor --5-5--;
          line 21, delete "C-C" and substitute therefor --8-8--;
          line 23, delete "D-D" and substitute therefor --9-9--;
          line 30, delete "E-E" and substitute therefor --12-12--;
          line 34, delete "F-F" and substitute therefor --14-14--;
          line 36, delete "G-G" and substitute therefor --15-15--;
          line 51, delete "H-H" and substitute therefor --22-22--; and
          line 53, delete "I-I" and substitute therefor --23-23--.

Signed and Sealed this

Eighth Day of June, 1999

Attest:

Q. TODD DICKINSON

*Attesting Officer*      *Acting Commissioner of Patents and Trademarks*